United States Patent [19]
Ohno et al.

[11] Patent Number: 5,322,323
[45] Date of Patent: Jun. 21, 1994

[54] COLLISION SENSING SYSTEM FOR SIDE AIR BAG SYSTEM

[75] Inventors: Mitsuyoshi Ohno; Toshihito Miyagawa, both of Toyota; Masahiro Taguchi, Hazu; Motonori Tominaga, Okazaki; Toshiaki Matsuhashi, Gamagori, all of Japan

[73] Assignees: Toyota Jidosha Kabushiki Kaisha, Toyota; Nippon Soken, Inc., Nishio; Nippondenso Co., Ltd., Kariya, all of Japan

[21] Appl. No.: 992,539

[22] Filed: Dec. 17, 1992

[30] Foreign Application Priority Data

Dec. 20, 1991 [JP] Japan .................. 3-355142

[51] Int. Cl.$^5$ .................................. B60R 21/22
[52] U.S. Cl. ................. 280/730 A; 180/286; 280/735
[58] Field of Search .......... 280/730 A, 735, 803, 280/728 R; 180/286, 274, 282, 263

[56] References Cited

U.S. PATENT DOCUMENTS

| | | | |
|---|---|---|---|
| 4,688,825 | 8/1987 | Arbogast et al. | 180/286 |
| 4,796,916 | 1/1989 | Rogers et al. | 280/803 |
| 4,966,388 | 10/1990 | Warner et al. | 280/730 |
| 5,044,456 | 9/1991 | Nishikaji | 180/268 |
| 5,072,966 | 12/1991 | Nishitake et al. | 280/730 A |
| 5,088,769 | 2/1992 | Furuhashi | 280/803 |

FOREIGN PATENT DOCUMENTS

| | | |
|---|---|---|
| 9010302 | 9/1990 | European Pat. Off. |
| 3716168 | 11/1988 | Fed. Rep. of Germany |
| 4115560 | 11/1991 | Fed. Rep. of Germany |
| 2429131 | 1/1980 | France |
| 2155862 | 6/1990 | Japan |
| 3-259639 | 9/1991 | Japan |
| 569791 | 3/1993 | Japan |

Primary Examiner—Eric Culbreth
Attorney, Agent, or Firm—Cushman, Darby & Cushman

[57] ABSTRACT

A collision sensing system for a side air bag system has a door opening state detector and an air bag actuation inhibiter. The side air bag system is provided with an air bag which is confined in a side door of a vehicle and inflated and expanded in a space between an occupant of the vehicle and the inner side wall of the compartment such as the side door when a collision detector detects a vehicle collision. The air bag actuation inhibiter inhibits the inflation of the air bag when the door opening state detector detects the open state of the side door.

7 Claims, 8 Drawing Sheets

COLLISION SENSING SYSTEM FOR SIDE AIR BAG SYSTEM

BACKGROUND OF THE INVENTION

1. Field of the Invention

The present invention relates to a collision sensing system for a side air bag system for detecting a collision of another vehicle against the side of a vehicle to inflate an air bag for protecting an occupant from a secondary collision.

2. Description of the Related Art

An air bag system for inflating its component air bag at the time of a collision against the side of a vehicle thereby to protect an occupant inflates the air bag with the inert gas such as nitrogen gas which is produced by an inflater. Especially in the air bag system of electric type, a gas producing agent in the inflater is ignited in response to a signal which is output from a collision sensor such as a pressure sensitive sensor or a contact sensor arranged in a predetermined position of the vehicle body when the collision sensor detects the collision. Then, the air bag is instantly charged to inflate with the massive gas produced by the inflater. As a result, the air bag is expanded between a vehicle occupant and the inner side wall of the compartment such as the inner wall of the side wall thereby to protect the occupant from any secondary collision against the inner side wall of the compartment.

Collision sensing systems for the side air bag system of the aforementioned kind have already been proposed by us and others as in Japanese Patent Publication No. 5-69791. FIGS. 8 and 9 show one example of the collision sensing system, FIG. 8 is a block diagram showing the collision sensing system, and FIG. 9 is a layout showing the arrangement of sensors. This collision sensing system is equipped in the individual side doors at the two sides of a vehicle body 1 with contact type side collision sensors 2, which are disposed fully of the door width, and on the side doors at the inner sides of the compartment with air bag modules 3, each of which is equipped with a not-shown air bag and an inflater for inflating the air bag. And, the side collision sensor 2 at each side door sends an ignition signal to the corresponding inflater when it detects a side collision. At the vehicle body 1, on the other hand, there are disposed acceleration sensors 4 and an air bag actuation control unit 5. If one of the acceleration sensors 4 detects an acceleration higher than a predetermined level, the air bag actuation control unit 5 sends an ignition signal to the corresponding inflater.

If, moreover, one of the collision sensors 2 and/or one of the acceleration sensors 4 detect a side collision, the air bag disposed in a position necessary for protecting the corresponding occupant is inflated.

In the collision sensing system for the side air bag system thus far described, however, the air bag may possibly be expanded in the following cases even at the time of non-collision, in which the air bag need not be operated. Specifically, in case the side door is violently opened with the vehicle being halted, in case the side door hits an obstacle such as a pole of street lighting, in case the open side door is hit by another automobile or a bicycle, or in case the side door is violently shut, either the collision sensors 2 disposed in the side doors or the acceleration sensors 4 disposed at the vehicle body may be turned ON by an impact similar to that at the time of a side collision thereby to send the ignition signal to the corresponding inflaters.

SUMMARY OF THE INVENTION

A major object of the present invention is to provide a collision sensing system for a side air bag system, which can be prevented from any malfunction at the time other than a collision time to inflate an air bag.

Thus, the collision sensing system according to the present invention is equipped with door opening state detecting means for detecting the opening and shutting of a door so that the actuation of the air bag may be inhibited if the door opening state detecting means detects the open state of the door.

The collision sensing system of the present invention can also be equipped with door opening state detecting means for detecting the opening and shutting of a door so that the actuation exclusively of the air bag disposed in an open door may be inhibited if the door opening state detecting means detects the open state of the door.

The collision sensing system of the present invention can also be equipped with door opening state detecting means for detecting the opening and shutting of a door so that the actuation of the air bag may be inhibited for a predetermined time period if the door opening state detecting means detects that the door is changed from its open state to its shut state.

The collision sensing system of the present invention can also be equipped with door opening state detecting means for detecting the opening and shutting of a door so that the subsequent actuation of the air bag may be continuously inhibited if the door opening state detecting means detects the open state of the door and if the collision is detected by the collision sensor when in the open state.

The above and further objects and novel features of the present invention will more fully appear from the following detailed description when the same is read in connection with the accompanying drawings. It is to be expressly understood, however, that the drawings are for the purpose of illustrations only and are not intended as a definition of the limits of the invention.

DETAILED DESCRIPTION OF THE PREFERRED EMBODIMENTS

The present invention will be specifically described in the following with reference to the accompanying drawings in connection with embodiments, in which a collision sensing system for a side air bag system according to the present invention is applied to a side air bag system of a two-door automobile.

Figure 1:
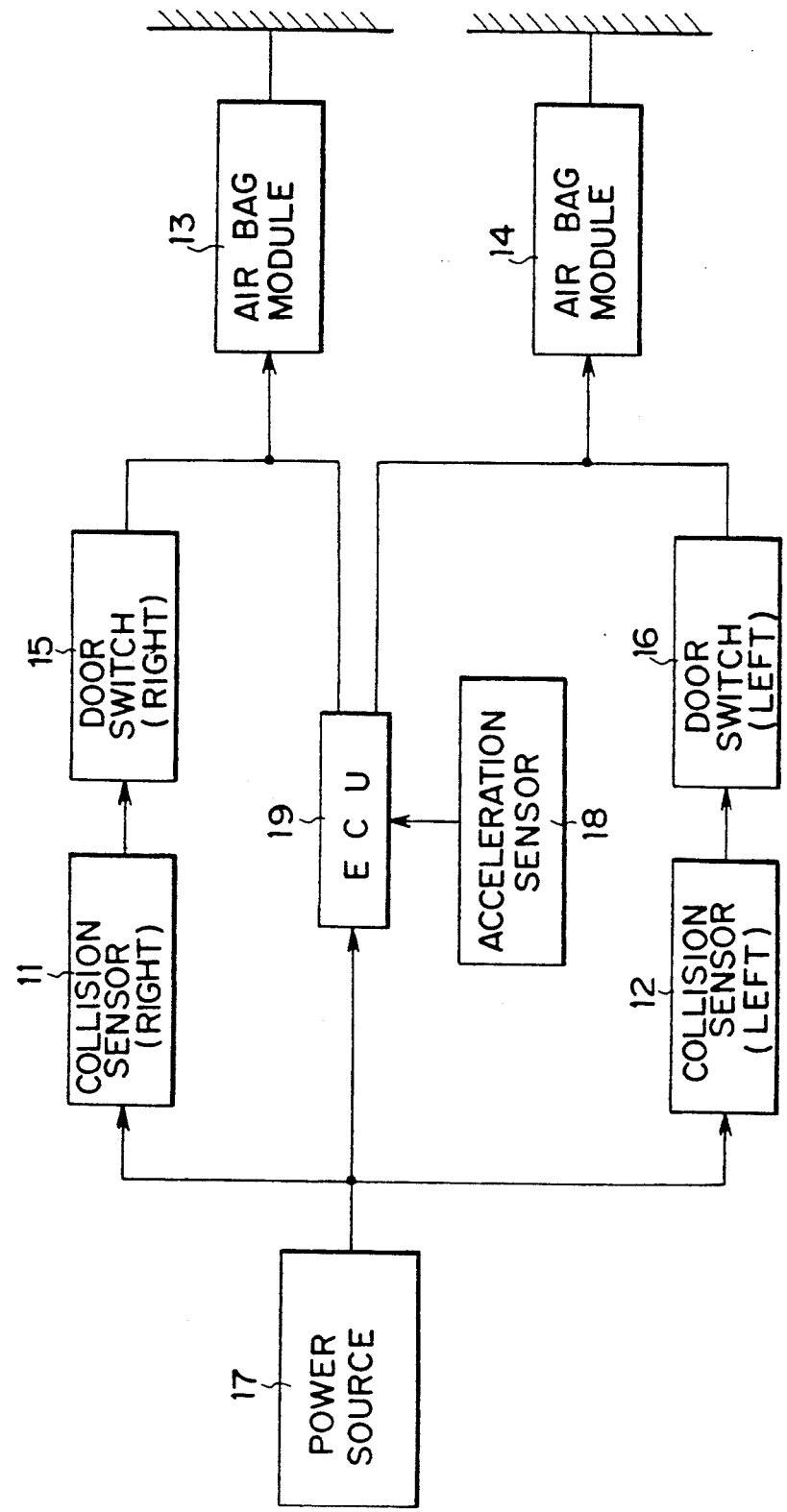
FIG. 1 is a block diagram showing a first embodiment of a collision sensing system for a side air bag system according to the present invention.

FIG. 1 shows a first embodiment of the collision sensing system of the present invention. This system is equipped with a righthand side collision sensor 11 and a lefthand side collision sensor 12, which are disposed in the righthand and lefthand side doors of the vehicle body so that they are turned ON if they are pushed to detect a collision at the time of a side collision. These side collision sensors 11 and 12 to be used can be exemplified by touch sensors having their contacts closed. On the individual side doors at the inner sides of the compartment, there are disposed air bag modules 13 and 14. Of these, the inflater of the righthand air bag module 13 has its (not-shown) ignition plug connected in series with a righthand door switch 15, which is turned ON if the righthand door is closed, and the righthand side collision sensor 11 which in turn is connected in series with the righthand door switch 15. Likewise, the inflater of the lefthand air bag module 14 has its (not-shown) ignition plug connected in series with a lefthand door switch 16, which is turned ON if the lefthand door is shut, and the lefthand side collision sensor 12 which in turn is connected in series with the lefthand door switch 16. As a result, if each side collision sensor 11 (or collision sensor 12) is turned ON and if the door switches 15 and 16 are turned ON with the side doors being shut, an igniting current is fed from a power source 17 to the inflaters of the air bag modules 13 and 14 so that the air bags are inflated and expanded with the nitrogen gas which is produced by the ignited inflaters. If, on the other hand, the righthand or lefthand side door is opened so that the righthand door switch 15 or the lefthand door switch 16 is turned OFF, the inflater of the air bag module 13 (or 14) disposed in the open side door is not fed with the igniting current.

In an arbitrary place on the vehicle body other than the door portions, on the other hand, there is disposed an acceleration sensor 18 for detecting the acceleration of a load to be input from the outside. The acceleration sensor 18 is connected with an electronic control unit 19 which in turn is connected in parallel with the aforementioned two collision sensors 11 and 12. This electronic control unit 19 compares the acceleration input from the acceleration sensor 18 with a predetermined acceleration and has its circuit closed, if it decides that the input acceleration exceeds the present value, to feed the igniting current from the power source 17 to the inflater of the air bag module 13. Thus, if the acceleration of the load input from the outside is equal to or higher than the predetermined value, the inflater is ignited so that the air bag is inflated and expanded with the nitrogen gas produced by the inflater.

Next, the operation of this embodiment will be described. If a running car body is hit at its righthand side by another vehicle, for example, the righthand side collision sensor 11 detects the collision and is turned ON. The righthand door switch 15 is also turned ON because the righthand and lefthand side doors are shut. Thus, the current is fed from the power source 17 to the air bag module 13 confined in the righthand side door having experienced the side collision, to ignite the corresponding inflater. As a result, the corresponding air bag is inflated with the nitrogen gas produced from the ignited inflater, so that the corresponding occupant is protected by that air bag from any secondary collision against the inner side wall of the compartment.

If, on the other hand, the side portion of the vehicle body such as the side of the front fender or rear fender having neither the side collision sensors 11 and 12 is hit by another vehicle, the acceleration detected by the acceleration sensor 18 at the time of the side collision is compared by the electronic control unit 19 with a predetermined collision deciding reference value. If the detected acceleration is lower than the predetermined value, the circuit is left OFF under the decision that the side collision is so weak that the occupant need not be protected by the air bag or that the detected acceleration is established by causes other than the collision. As a result, the air bag is not inflated. If the detected acceleration is higher than the predetermined value, the circuit is closed to feed the igniting current so that the inflater is ignited to inflate and expand the air bag with the produced gas. Thus, the occupant can be protected by the air bag from any secondary collision against the inner side wall of the compartment.

If the vehicle is halted to have its lefthand side door hit by an obstacle such as a utility pole when this door is opened, for example, the lefthand side door is opened to have its switch 16 turned OFF. As a result, no igniting current will flow even if the lefthand side collision sensor 12 is turned ON with the impact coming from the obstacle. Thus, it is possible to prevent the inflation of the air bag at the time of non-collision.

Figure 2:
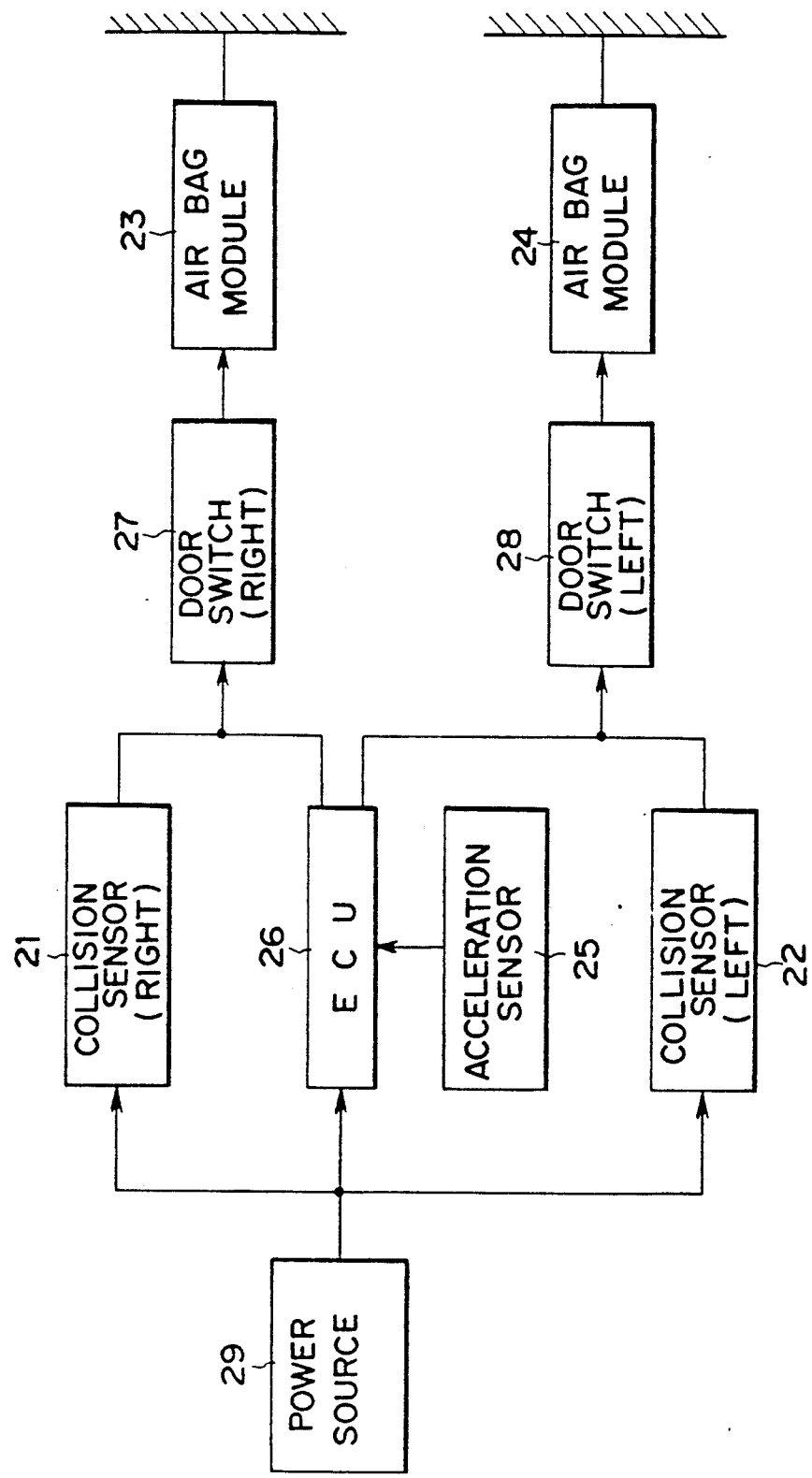
FIG. 2 is a block diagram showing a collision sensing system according to a second embodiment.

FIG. 2 shows a second embodiment of the present invention. This collision sensing system is equipped with a righthand side collision sensor 21 and a lefthand side collision sensor 22 in the individual side doors at the righthand and lefthand sides of the vehicle body and with air bag modules 23 and 24 on the side doors at the inner sides of the compartment. In an arbitrary place on the vehicle body, there is disposed an acceleration sensor 25 which is connected with an electronic control unit 26. On the other hand, a righthand door switch 27 and a lefthand door switch 28 are individually connected between the righthand and lefthand side collision sensors 21 and 22 and the air bag modules 23 and 24. The righthand and lefthand side collision sensors 21 and 22 and the electronic control unit 26 are connected in parallel. Of these, the righthand side collision sensor 21 and the electronic control unit 26 are connected in series with the righthand air bag module 23 through the righthand door switch 27, and the lefthand side collision sensor 22 and the electronic control unit 26 are connected in series with the lefthand air bag module 24 through the lefthand door switch 28.

Thus, if either the righthand side collision sensor 21 or the electronic control unit 26 and the righthand door switch 27 are turned ON, the ignition current is fed from a power source 29 to the inflater of the righthand air bag module 23 so that the air bag is inflated with the nitrogen gas produced. Likewise, if either the lefthand side collision sensor 22 or the electronic control unit 26 and the lefthand door switch 28 are turned ON, the ignition current is fed from the power source 29 to the inflater of the lefthand air bag module 24 so that the air bag is inflated with the produced nitrogen gas.

Next, the operations of the embodiment thus constructed will be described. If the righthand and lefthand side doors are shut as while the vehicle is running, that is, if both the righthand and lefthand door switches 27 and 28 are ON, the second embodiment operates substantially as in the case of the foregoing first embodiment to achieve similar effects.

Moreover, if the lefthand side door is opened for a passenger to get on and off the vehicle being halted and is hit at its side by another vehicle, the lefthand side collision sensor 22 detects the collision and is turned ON, but the lefthand door switch 28 is left OFF so that no current will flow.

If, on the other hand, the righthand side door being closed is hit by another vehicle while the opposite lefthand side door is open for a passenger to get on and off the vehicle, the ignition current will flow from the power source 29, because the righthand door switch 27 is ON when the righthand side collision sensor 21 detects the collision and is turned ON. As a result, the righthand air bag module 23 can have its air bag inflated and expanded to protect the passenger from any secondary collision against the righthand side wall of the compartment.

Thus, according to the collision sensing system of this embodiment, the air bag confined in the open side door will fail to be expanded to its normal position so that its protection of the passenger will be incomplete. Hence, the useless inflation and expansion of the air bag can be prevented by actuating only the air bag confined in the shut side door while inhibiting the actuation of the air bag in the open side door.

Figure 3:
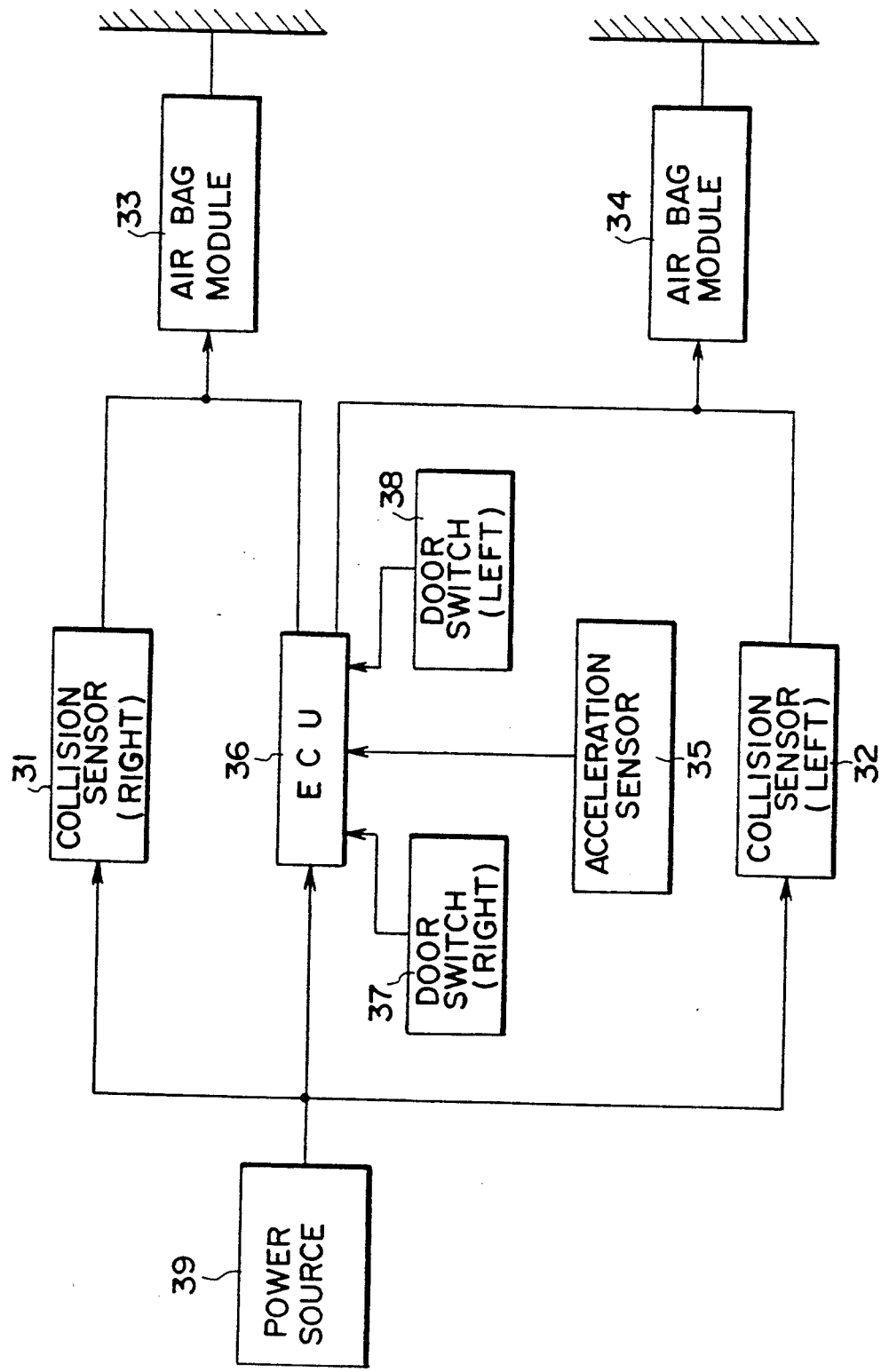
FIG. 3 is a block diagram showing a collision sensing system according to a third embodiment.

FIG. 3 shows a third embodiment of the present invention. This collision sensing system is equipped with a righthand side collision sensor 31 and a lefthand side collision sensor 32 in the individual side doors of the vehicle body and with air bag modules 33 and 34 on the side doors at the inner sides of the compartment. In an arbitrary place on the vehicle body, there is disposed an acceleration sensor 35 which is connected with an electronic control unit 36 equipped with a timer or a time limit circuit. The electronic control unit 36 is connected with a righthand door switch 37 and a lefthand door switch 38 so that it is fed with signals indicating the opening states of the two side doors. The righthand and lefthand side collision sensors 31 and 32 and the electronic control unit 36 are connected in parallel. At the same time, the righthand side collision sensor 31 and the electronic control unit 36 are connected in series with the righthand air bag module 33, and the lefthand side collision sensor 32 and the electronic control unit 36 are connected in series with the lefthand air bag module 34.

If either of the righthand and lefthand side collision sensors 31 and 32 is turned ON, the air bag module 33 or 34 at the corresponding side has its inflater fed with the ignition current from a power source 39 so that the corresponding air bag is inflated with the nitrogen gas produced. In case at least one of the righthand and lefthand side doors is open so that its door switch 37 (or 38) is OFF, the actuation of the corresponding air bag is inhibited for a predetermined time period (e.g., about 1 second) by the timer or time limit circuit in the electronic control unit 36 even if that side door is closed to have its door switch 37 (or 38) turned ON.

Next, the operation of this embodiment will be described. If the righthand and lefthand side doors are shut such as while the vehicle is running, that is, if both the righthand and lefthand door switches 37 and 38 are ON, the third embodiment operates substantially as in the case of the foregoing two embodiments to achieve similar effects. If, on the other hand, the lefthand side door is violently shut after the passenger got off the vehicle by halting the vehicle and opening that side door, a high impact is applied to the vehicle body and is detected by the acceleration sensor 35, and the lefthand door switch 38 is turned ON. Since, however, the actuation of the corresponding air bag is inhibited for the predetermined time period after the lefthand side door was shut, the lefthand air bag module 34 has its inflater fed with no ignition current thereby to prevent the unnecessary inflation and expansion of the air bag.

Thus, according to the collision sensing system of this embodiment, the actuation of the air bag is inhibited for the predetermined time period, even if the door switch is turned ON in case the corresponding open side door is shut. As a result, the air bag can be inhibited from being inflated with the impact coming from the violent shutting of the corresponding side door, so that it can be prevented from any useless inflation and expansion.

Figure 4:
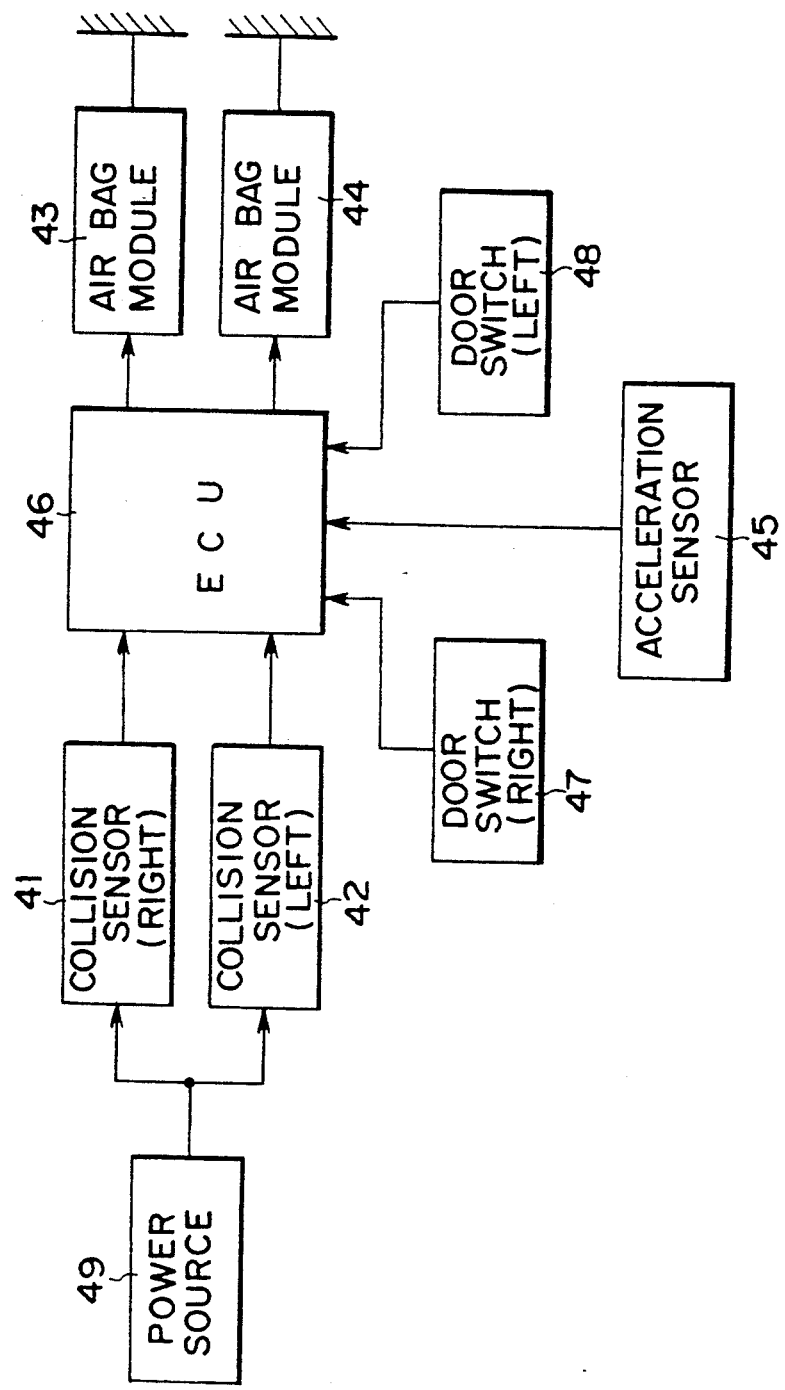
FIG. 4 is a block diagram showing a collision sensing system according to a fourth embodiment.

FIG. 4 shows a fourth embodiment of the present invention. This collision sensing system is equipped with a righthand side collision sensor 41 and a lefthand side collision sensor 42 in the individual side doors of the vehicle body and with air bag modules 43 and 44 on the side doors at the inner sides of the compartment. In an arbitrary place on the vehicle body, there is disposed an acceleration sensor 45 which is connected with an electronic control unit 46 having an inhibition hold circuit for holding the actuation inhibited state of an air bag. The electronic control unit 46 is connected with the aforementioned two collision sensors 41 and 42. The control unit 46 is further connected with a righthand door switch 47 and a lefthand door switch 48 so that it is fed with signals indicating the opening states of the righthand and lefthand side doors. Moreover, the righthand and lefthand side collision sensors 41 and 42, the electronic control unit 46, and the righthand and lefthand air bag modules 43 and 44 are individually connected in series.

In case one of the side doors is open so that its door switch 47 (or 48) is OFF, an output signal is input to the electronic control unit 46 if the side collision sensor 41 (or 42) at the corresponding side is turned ON. Then, the inhibition hold circuit acts to inhibit the actuation of the air bag in the air bag module 43 (or 44) in the corresponding side door. This inhibited state of the air bag actuation continues until it is released.

Next, the operation of this embodiment will be described. If the righthand and lefthand side doors are shut as while the vehicle is running, that is, if both the righthand and lefthand side door switches 47 and 48 are ON, the fourth embodiment operates substantially as in the case of the foregoing individual embodiments to achieve similar effects.

If the lefthand side door is hit, when opened, by an obstacle such as a utility pole while the vehicle is being halted, its door switch 16 is OFF. As a result, no ignition current will flow even if the lefthand side collision sensor 42 is turned ON with the impact coming from the obstacle, so that the inflation of the corresponding air bag can be prevented. When the lefthand side door is shut, the lefthand door switch 48 is turned ON, but the inhibition hold circuit of the electronic control unit 46 acts to inhibit the inflation of the air bag.

In this embodiment, therefore, while the door switch 47 (or 48) is OFF, the air bag actuation of the air bag module in the open side door is inhibited anymore once the collision sensor 41 (or 42) is turned ON. As a result, the useless inflation of the air bag can be prevented even if the side door is shut so that the corresponding door switch 47 (or 48) is turned ON. In this case, however, it is necessary for the driver to be informed by means of a display on the instrumental panel or a lighting or acoustic warning, of the fact that the air bag system is in its operation inhibited state. Then, the driver can be prepared for replacing the side collision sensor or for repairing the damaged portion of the door or the like.

Figure 5:
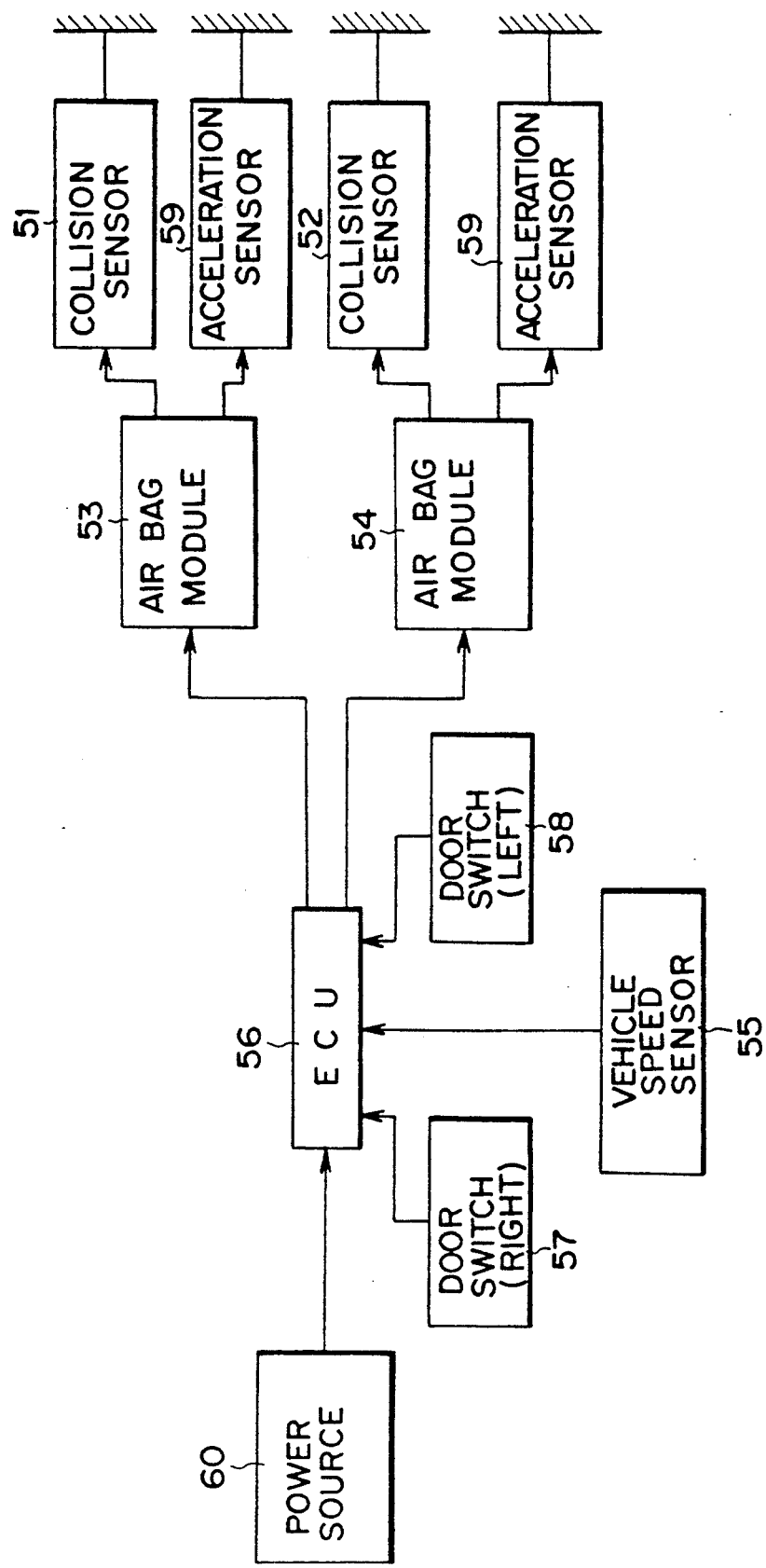
FIG. 5 is a block diagram showing a collision sensing system according to a fifth embodiment.
Figure 6:
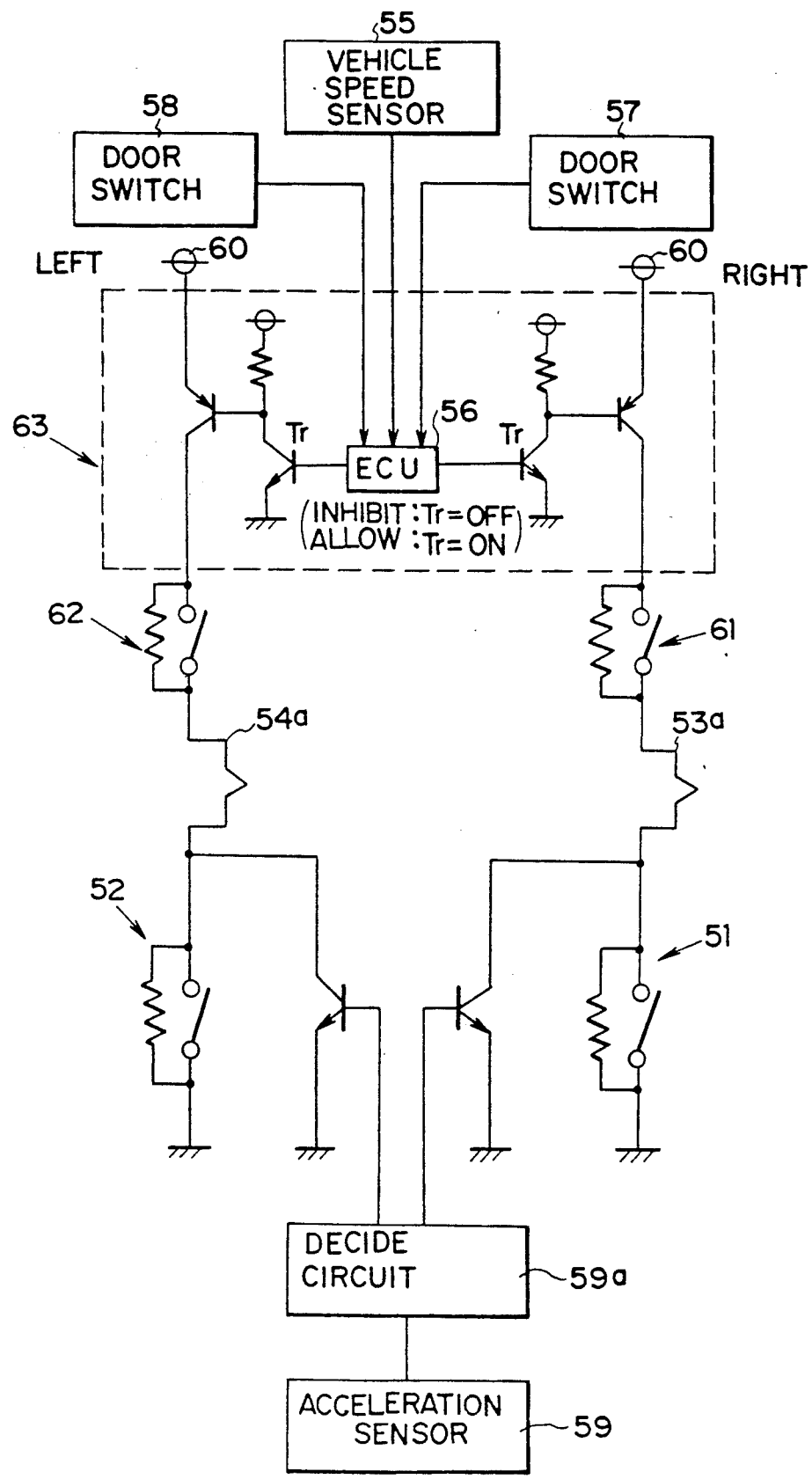
FIG. 6 is a connection diagram showing the collision sensing system of the fifth embodiment.
Figure 7:
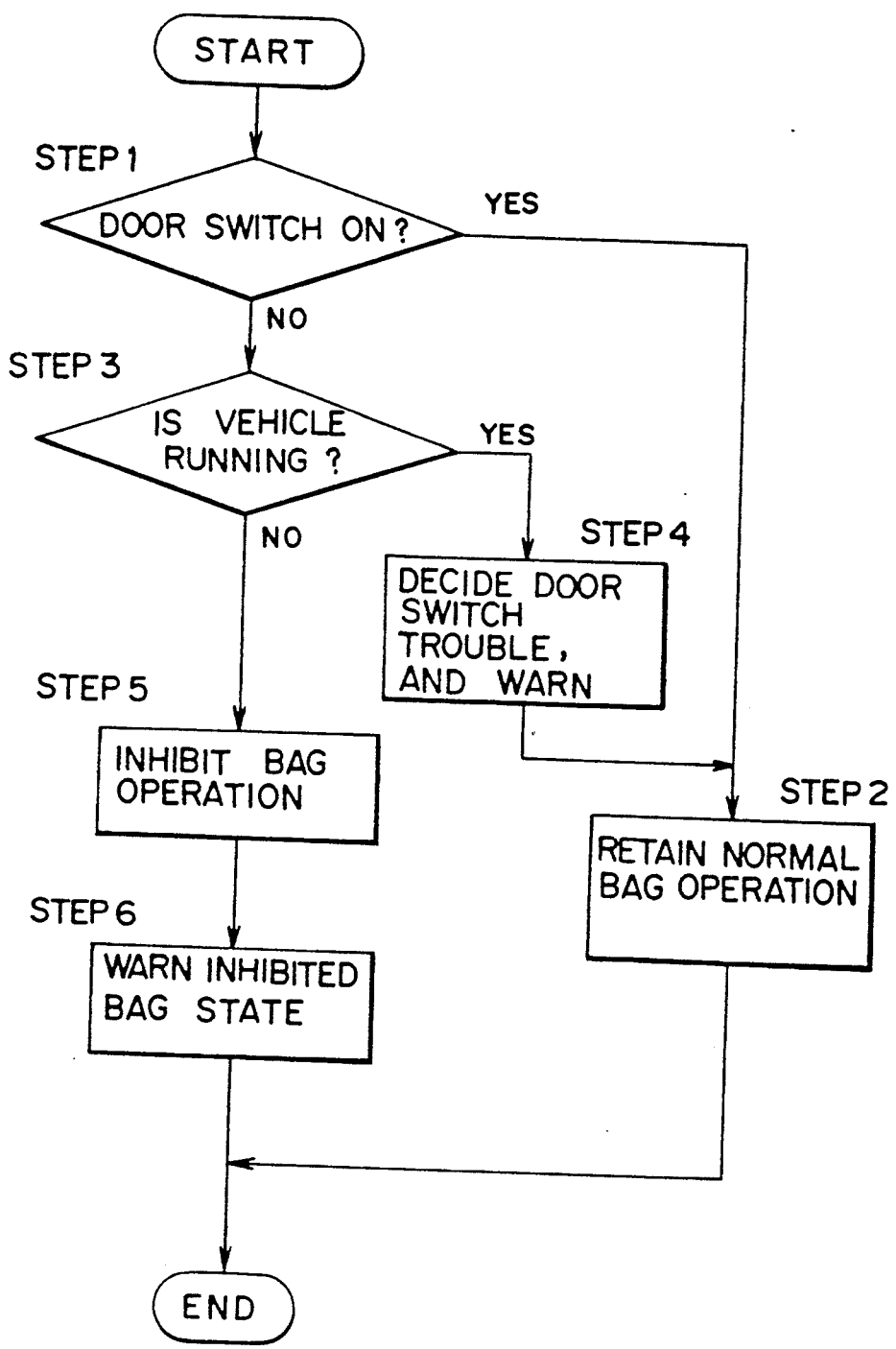
FIG. 7 is a flow chart showing the controls to be carried out in a control system according to the fifth embodiment.
Figure 8:
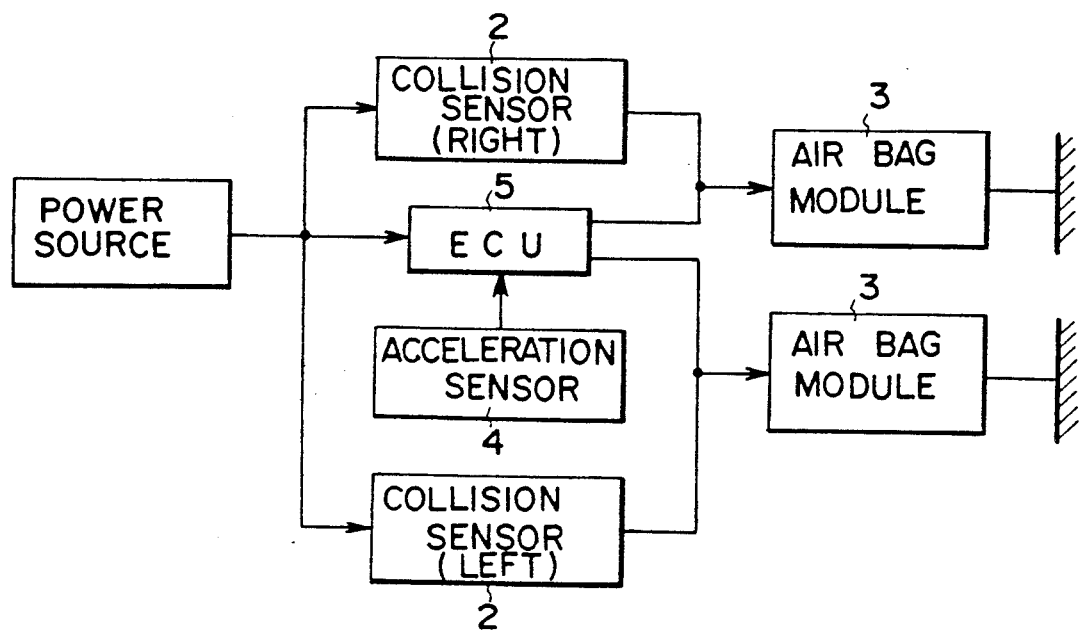
FIG. 8 is a block diagram showing one example of the collision sensing system which was already proposed by us and others.
Figure 9:
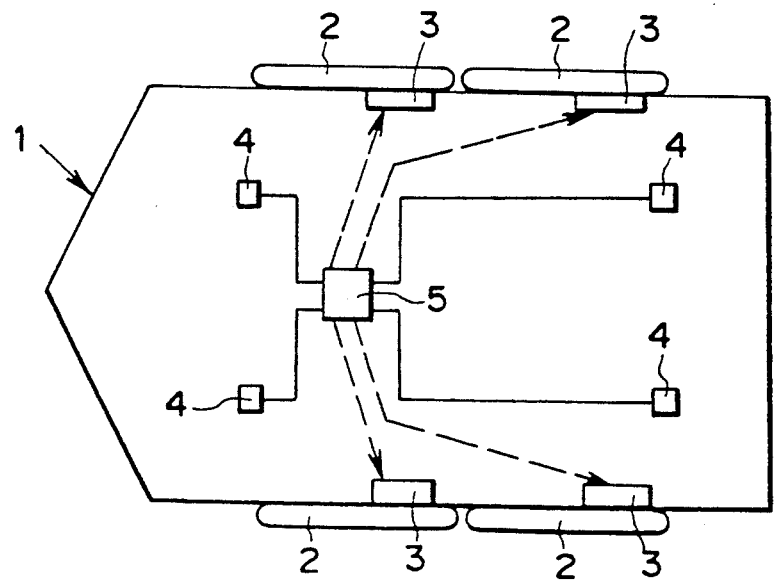
FIG. 9 is an explanatory layout showing the arrangement of sensors in the collision sensing system which was already proposed by us and others.

FIGS. 5 to 7 show a fifth embodiment of the present invention. As shown in FIGS. 5 to 7, this collision sensing system is equipped with a righthand side collision sensor 51 and a lefthand side collision sensor 52 in the individual righthand and lefthand side doors of the vehicle body and with air bag modules 53 and 54 on the side doors at the inner sides of the compartment. Moreover, a vehicle speed sensor 55 is mounted on the (not-shown) transmission and is connected to input its detected vehicle speed data to an electronic control unit 56. In the vicinity of the righthand and lefthand side doors, on the other hand, there are disposed a righthand door switch 57 and a lefthand door switch 58 which are respectively turned ON when the corresponding side doors are shut. These door switches 57 and 58 are connected to input the individual opening and shutting states of the side doors to the electronic control unit 56.

Moreover, the electronic control units 56 are connected to feed ignition currents to the individual squibs 53a and 54a of the righthand and lefthand air bag modules 53 and 54. The squib 53a of the righthand air bag module 53 is earthed to the vehicle body through the side collision sensor 51 and through an acceleration sensor 59 and a decide circuit 59a. The squib 54a of the lefthand air bag module 54 is like-wise earthed to the vehicle body through the side collision sensor 52 and through the acceleration sensor 59 and the decide circuit 59a.

Between the electronic control unit 56 and a power source 60, there are connected safety sensors 61 and 62 and an inhibit circuit (as enclosed by broken lines in FIG. 6) 63 for inhibiting the air bag operations. The safety sensor 61 is turned ON when the acceleration at the time of a collision exceeds a predetermined level. Thus, even if the righthand or left-hand) side collision sensor 51 (or 52) is turned ON by an external force applied to the corresponding side door, the corresponding safety sensor 61 (or 62) inhibits any current flow to the squib 53a (or 54a) unless it detects an acceleration exceeding the predetermined level and is turned ON, so that it can prevent any malfunction of the air bag system at a non-collision instant when the side collision sensor 51 (or 52) is turned ON by kicking the corresponding side door during the parking.

Moreover, the inhibit circuit 63 is kept inactive to cause the air bag system to work normally, when a vehicle speed is detected (indicating that the vehicle is running) in response to the signal input from the vehicle speed sensor 55 to the electronic control unit 56 and when the door switch ON signals (indicating that the doors are shut) are inputted from the righthand and lefthand door switches 57 and 58 to the electronic control unit 56. On the other hand, when the vehicle speed is not detected (indicating that the vehicle is stopped) and when at least one of the door switch OFF signals (indicating that the door or doors are open) is input, the inhibit circuit 63 decides the non-collision state and inhibits the air bag operations. On the other hand, moveover, when the vehicle speed is detected (indicating that the vehicle is running) and when either of the door switch OFF signals (indicating that the corresponding door is open) is input, the electronic control unit 56 decides that the corresponding door switch 57 (or 58) is troubled, and precludes the inhibition of the inhibit circuit 63 so as to cause the normal operations of the air bag system.

The operations of this embodiment thus constructed will be described in the following with reference to the flow chart of FIG. 7.

When the ignition switch is turned ON at first, a control program stored in advance in the electronic control unit 56 starts to decide as Step 1 whether or not the door switches 57 (and 58) are ON. If YES (indicating that the side doors are shut), the routine advances to Step 2, at which the normal operations of the air bag system are retained.

If, on the other hand, it is decided at Step 1 that at least the door switch 57 (or 58) is OFF (indicating that the corresponding side door is open), the routine advances to Step 3, at which it is decided whether or not the vehicle is running. If the signal from the vehicle speed sensor 55 indicates the running state, the routine advances to Step 4, at which it is decided that the door switch 57 (or 58) is not closed when it should be, and at which the door switch trouble is warned in an indicator. Then, the routine advances to Step 2, at which the normal operations of the air bag system are also retained.

On the other hand, if it is decided at Step 3 from the signal of the vehicle speed sensor 55 that the vehicle is stopped, the routine advances to Step 5, at which the operations of the air bag system are inhibited by the inhibit circuit 63. Then, the routine advances to Step 6, at which it is warned by the indicator to the driver that the air bag system is in its operation inhibited state.

Thus, in this embodiment, the useless expansion of the air bag at a non-collision time is prevented by providing the vehicle speed sensor 55 to input the signal indicating whether or not the vehicle is running to the electronic control unit 56, and by causing this control unit 56 to control the inhibit circuit 63 to inhibit the air bag system even if the side collision sensor 51 (or 52) is turned ON when the vehicle is stopped and when at least one of the side doors is open.

Incidentally, the foregoing individual embodiments are equipped as the door opening state detecting means with the door switches 15 and 16, 27 and 28, 37 and 38, 47 and 48, and 57 and 58, but these door switches may be replaced by the courtesy lamp switches disposed in the vehicle so that the door opening state may be detected. In this modification, these lamp switches are turned ON, if the corresponding side doors are opened, and OFF if the same are shut, unlike the aforementioned cases of the door switches.

What is claimed is:

1. A collision sensing system for a side air bag system in which an air bag confined in a side door of a vehicle is inflated in a space between an occupant of the vehicle and the inner side wall of the compartment when collision detecting means detects a vehicle collision, comprising switch means for opening a circuit when the side door is opened.
   wherein said collision detecting means including a touch sensor connected in series with said switch means and having contacts closed in response to the vehicle collision.

2. A collision sensing system for a side air bag system according to claim 1,
wherein said collision detecting means further includes: an acceleration sensor for detecting an acceleration or deceleration; and acceleration deciding means for outputting a signal for operating said side air bag system when the acceleration or deceleration detected by said acceleration sensor is equal to or higher than a predetermined value, and
wherein said acceleration deciding means is connected in parallel with said switch means and said touch sensor.

3. A collision sensing system for a side air bag system according to claim 1,
wherein said collision detecting means further includes: an acceleration sensor for detecting an acceleration or deceleration; and acceleration deciding means for outputting a signal for operating said side air bag system when the acceleration or declaration detected by said acceleration sensor is equal to or higher than a predetermined value, and
wherein said acceleration deciding means in connected in parallel with said touch sensor and in series with said switch means.

4. A collision sensing system for a side air bag system according to claim 1, further comprising inhibition hold means for holding an inhibiting state of the air bag after the touch sensor contact is closed when the side door is open.

5. A collision sensing system for a side air bag system according to claim 1, further comprising a halt detecting means for detecting a halt state of the vehicle;
wherein the air bag is inflated only when the switch means closes the circuit when the side door is closed, the touch sensor closes the contact and the halt detecting means detects the halt state of the vehicle.

6. A collision sensing system for a side air bag system according to claim 5,
wherein the halt detecting means includes a vehicle speed sensor.

7. A collision sensing system for a side air bag system in which an air bag confined in a side door of a vehicle is inflated in a space between an occupant of the vehicle and the inner side wall of the compartment when collision detecting means detects a vehicle collision,
comprising side door opening state detecting means for outputting a signal according to the open state of the side door,
said collision detecting means including:
an acceleration sensor for detecting an acceleration;
acceleration deciding means connected with said acceleration sensor and said side door opening state detecting means; and
a touch sensor having a circuit closed in response to a collision of the vehicle and connected in parallel with said acceleration deciding means.

* * * * *

UNITED STATES PATENT AND TRADEMARK OFFICE
CERTIFICATE OF CORRECTION

PATENT NO. : 5,322,323
DATED : June 21, 1994
INVENTOR(S) : OHNO, et al.

It is certified that error appears in the above-identified patent and that said Letters Patent is hereby corrected as shown below:

Col. 8, line 65, claim 1, change "including" to -- includes --.

Signed and Sealed this

Fifteenth Day of November, 1994

*Attest:*

BRUCE LEHMAN

*Attesting Officer*        *Commissioner of Patents and Trademarks*